US008561191B1

(12) United States Patent (10) Patent No.: US 8,561,191 B1
Hinchliffe et al. (45) Date of Patent: Oct. 15, 2013

(54) SYSTEM, METHOD AND COMPUTER PROGRAM PRODUCT FOR GENERATING AN ENCODED NAME FOR UNWANTED CODE

(75) Inventors: Alexander James Hinchliffe, Milton Keynes (GB); Anthony Abrahams, Buckingham (GB); Fraser Peter Howard, Chipping Norton (GB); Anthony V. Bartram, Milton Keynes (GB)

(73) Assignee: McAfee, Inc., Santa Clara, CA (US)

( * ) Notice: Subject to any disclaimer, the term of this patent is extended or adjusted under 35 U.S.C. 154(b) by 1427 days.

(21) Appl. No.: 11/625,094

(22) Filed: Jan. 19, 2007

(51) Int. Cl.
 *H04L 29/06* (2006.01)
(52) U.S. Cl.
 USPC .................... 726/24; 726/22; 726/23; 726/25
(58) Field of Classification Search
 USPC .......................................... 726/24, 22, 23, 25
 See application file for complete search history.

(56) References Cited

U.S. PATENT DOCUMENTS

| | | | | |
|---|---|---|---|---|
| 3,474,234 | A * | 10/1969 | Rieger et al. ................... | 235/454 |
| 3,654,438 | A * | 4/1972 | Wyatt et al. ..................... | 235/84 |
| 4,542,469 | A * | 9/1985 | Brandyberry et al. .......... | 702/62 |
| 5,388,233 | A * | 2/1995 | Hays et al. ...................... | 712/208 |
| 6,240,530 | B1 * | 5/2001 | Togawa ............................ | 714/38 |
| 6,622,150 | B1 * | 9/2003 | Kouznetsov et al. ......... | 707/200 |
| 6,654,751 | B1 * | 11/2003 | Schmugar et al. .............. | 707/10 |
| 6,718,469 | B2 * | 4/2004 | Pak et al. ......................... | 726/24 |
| 7,065,790 | B1 * | 6/2006 | Gryaznov ........................ | 726/24 |
| 7,231,440 | B1 * | 6/2007 | Kouznetsov et al. ......... | 709/224 |
| 7,257,841 | B2 * | 8/2007 | Naitoh ............................. | 726/24 |
| 7,310,818 | B1 * | 12/2007 | Parish et al. .................... | 726/24 |
| 7,584,170 | B2 * | 9/2009 | Coulson et al. .................. | 707/2 |
| 2002/0129081 | A1 * | 9/2002 | Rai et al. ........................ | 709/102 |
| 2002/0138760 | A1 * | 9/2002 | Naitoh .......................... | 713/201 |
| 2003/0070088 | A1 | 4/2003 | Gryaznov ..................... | 713/201 |
| 2007/0143843 | A1 * | 6/2007 | Nason et al. .................... | 726/22 |

OTHER PUBLICATIONS

Bontchev, Dr. Vesselin; Current Status of the CARO Malware Naming Scheme [online]; Dec. 18, 2006 [retrived on Dec. 8, 2009]; FRISK Software International; Retrieved from the Internet: <URL:http://web.archive.org/web/20061218074732/http://www.people.frisk-software.com/~bontchev/papers/naming.html>; pp. 1-32.*
Robert Vamosi, "Why virus Names Should Be Much, Much Simpler" http://review.zdnet.com/4520-7297_16-4207801.html, 2003.
"McAfee Virus Profile:Raze" McAfee-Computer Anti-Virus Software and Internet Security for Your PC, 2005.
Costin Riau, "A Virus by Any Other Name: Virus Naming Practices" Kaspersky Labs, Romania, Jun. 3, 2002 http://www.securityfocus.com/infocus/1587.

* cited by examiner

*Primary Examiner* — Bradley Holder
(74) *Attorney, Agent, or Firm* — Patent Capital Group

(57) ABSTRACT

A naming system, method and computer program product are provided. In use, unwanted code including at least one attribute is identified. In addition, an encoded name is generated for the unwanted code, where at least a portion of the encoded name represents the at least one attribute of the unwanted code.

17 Claims, 6 Drawing Sheets

(1)

SYSTEM, METHOD AND COMPUTER PROGRAM PRODUCT FOR GENERATING AN ENCODED NAME FOR UNWANTED CODE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to unwanted code, and more particularly to naming unwanted code.

2. Description of Related Art

Increasingly, computer systems have needed to protect themselves against unwanted code. Such unwanted computer code has generally taken the form of viruses, worms, Trojan horses, spyware, ad ware, and so forth. To combat the dissemination of unwanted code, systems (e.g. intrusion detection systems, virus scanners, etc.) have been created for identifying new types of unwanted code and for generating data (e.g. signatures, etc.) utilized for future detection of such unwanted code. For each identification of a new instance of unwanted code, a unique name is typically generated for subsequent identification thereof. However, names of unwanted code are generally limited in length, thus limiting the ability of the name to adequately describe the unwanted code.

There is thus a need for overcoming these and/or other issues associated with the prior art.

BRIEF SUMMARY OF THE INVENTION

A naming system, method and computer program product are provided for generating an encoded name for unwanted code. In use, unwanted code including at least one attribute is identified. In addition, an encoded name is generated for the unwanted code, where at least a portion of the encoded name represents the at least one attribute of the unwanted code.

DETAILED DESCRIPTION OF THE INVENTION

Figure 1:
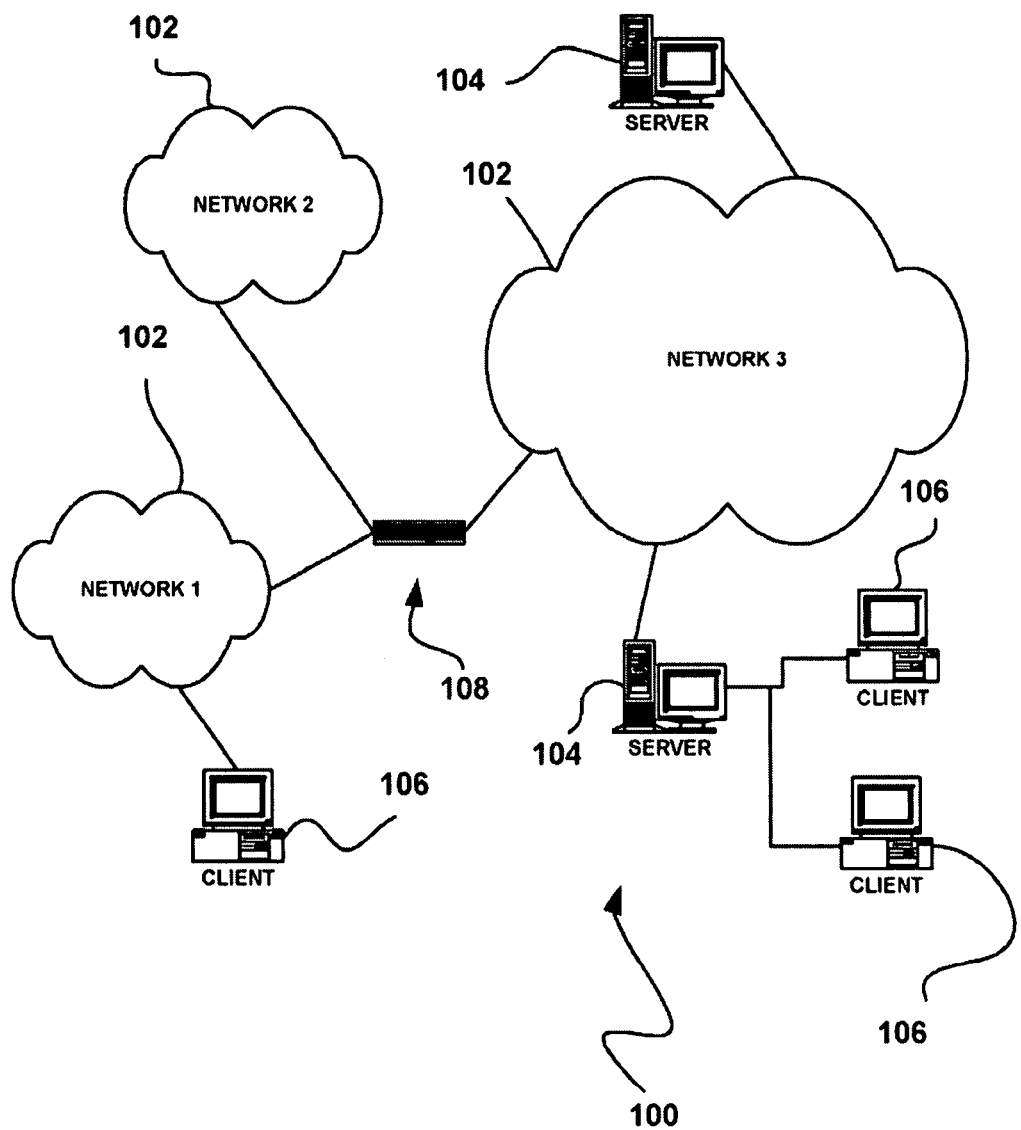
FIG. 1 illustrates a network architecture, in accordance with one embodiment

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer/device, and/or any other type of logic, for that matter. In order to facilitate communication among the networks 102, at least one gateway 108 is optionally coupled therebetween.

Figure 2:
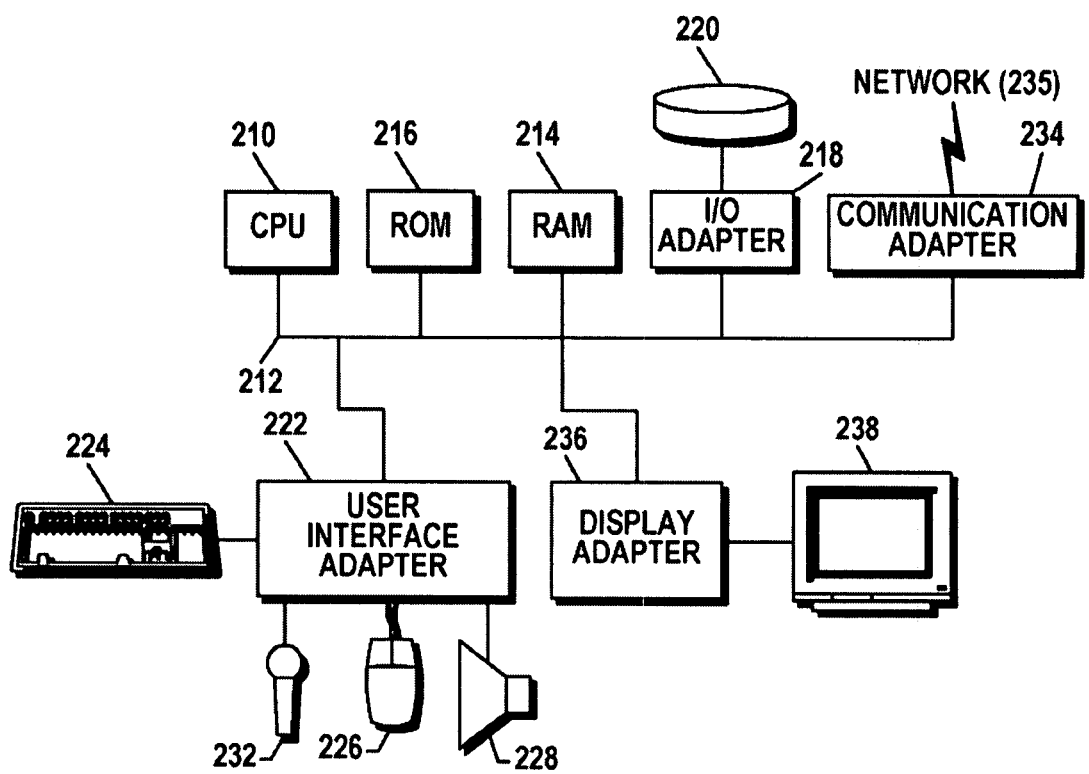
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit (CPU) 210, such as a microprocessor and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology, Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
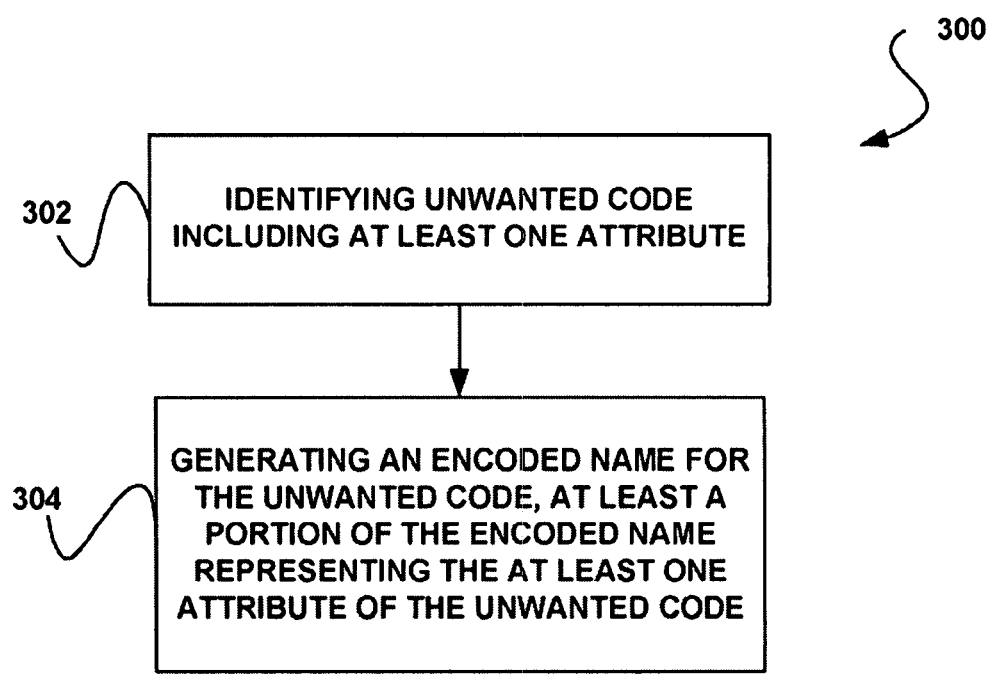
FIG. 3 shows a method for generating an encoded name for unwanted code, in accordance with one embodiment.

FIG. 3 shows a method 300 for generating an encoded name for unwanted code, in accordance with one embodiment. As an option, the method 300 may be implemented in the context of the architecture and environment of FIGS. 1 and/or 2. Of course, however, the method 300 may be carried out in any desired environment.

As shown in operation 302, unwanted code that includes at least one attribute is identified. The unwanted code may include any type of data and/or instructions, etc. that is unwanted and that is capable of being located on a device. Such device may include any of the servers and/or clients described above with respect to FIG. 1. Just by way of example, the unwanted code may include malware (e.g. known, unknown, viruses, worms, etc.), spyware, adware, etc. In one exemplary embodiment, the unwanted code may be capable of exploiting an operating system and/or software located on the computer.

In addition, in the context of the present description, the attribute may include any characteristic, trait, feature, aspect, and/or quality, etc. associated with the unwanted code. In one possible embodiment, the attribute may optionally reflect an attribute utilized in proliferating (e.g. spreading, maintaining, etc.) the unwanted code. In another embodiment, the attribute may include a type of the unwanted code. For example, the type of the unwanted code may include a worm, a virus, generic malware, parasitic, internet relay chat related (IRC), peer-to-peer related, downloadable, etc.

In other embodiments, the attribute may include an effect of the unwanted code. For example, the effect may include an effect on a computer on which the unwanted code is located. By way of illustration only, such effect may include modifying an Internet homepage, lowering Internet Explorer® zones, stealing passwords, and/or any other effect capable of being attributed to the unwanted code.

In yet another embodiment, the attribute may include a file format of the unwanted code. The file format may include a type of file in which the unwanted code is stored [e.g. dynamic link library (DLL) file, executable file, script file, etc.]. In addition, the file format may include an application programming interface (API) capable of utilizing the file (e.g. Windows®, etc.). Further, the file format may include a configuration of the unwanted code, such as for example, encrypted, packed, etc.

While various embodiments of attributes associated with unwanted code have been described herein, it should be noted that anything capable of being associated with the unwanted code may be included as an attribute of the unwanted code. Moreover, while a single attribute has been described above, it should also be noted that a plurality of attributes may be associated with the unwanted code in other embodiments. Still yet, the plurality of attributes may include any combination of different attributes, such as for example, the attributes described herein.

Further, an encoded name for the unwanted code is generated. See operation 304. At least a portion of the encoded name represents at least one attribute of the unwanted, code. The encoded name of the unwanted code may include any identifier capable of identifying the unwanted code and is encoded. Optionally, in some exemplary embodiments, a bitmask may be utilized for encoding the name, but of course, any other encoding scheme capable of encoding a name may be utilized.

Further, the encoded name may be in any desired format. For example, the encoded name may take the form of a hexadecimal format. In other various embodiments, the encoded name may include a sequence of characters, numbers, etc. Thus, in some embodiments, the encoded name may include any name converted to a particular format.

Moreover, at least a portion of the encoded name may represent any desired number (e.g. 8, 16, 32, etc.) of attributes of the unwanted code. Just by way of example, if the unwanted code is associated with a virus attribute, the encoded name may represent such virus attribute. Accordingly, the encoded name of the unwanted code may be utilized for describing attributes of the unwanted code.

More illustrative information will now be set forth regarding various optional architectures and features of different embodiments with which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
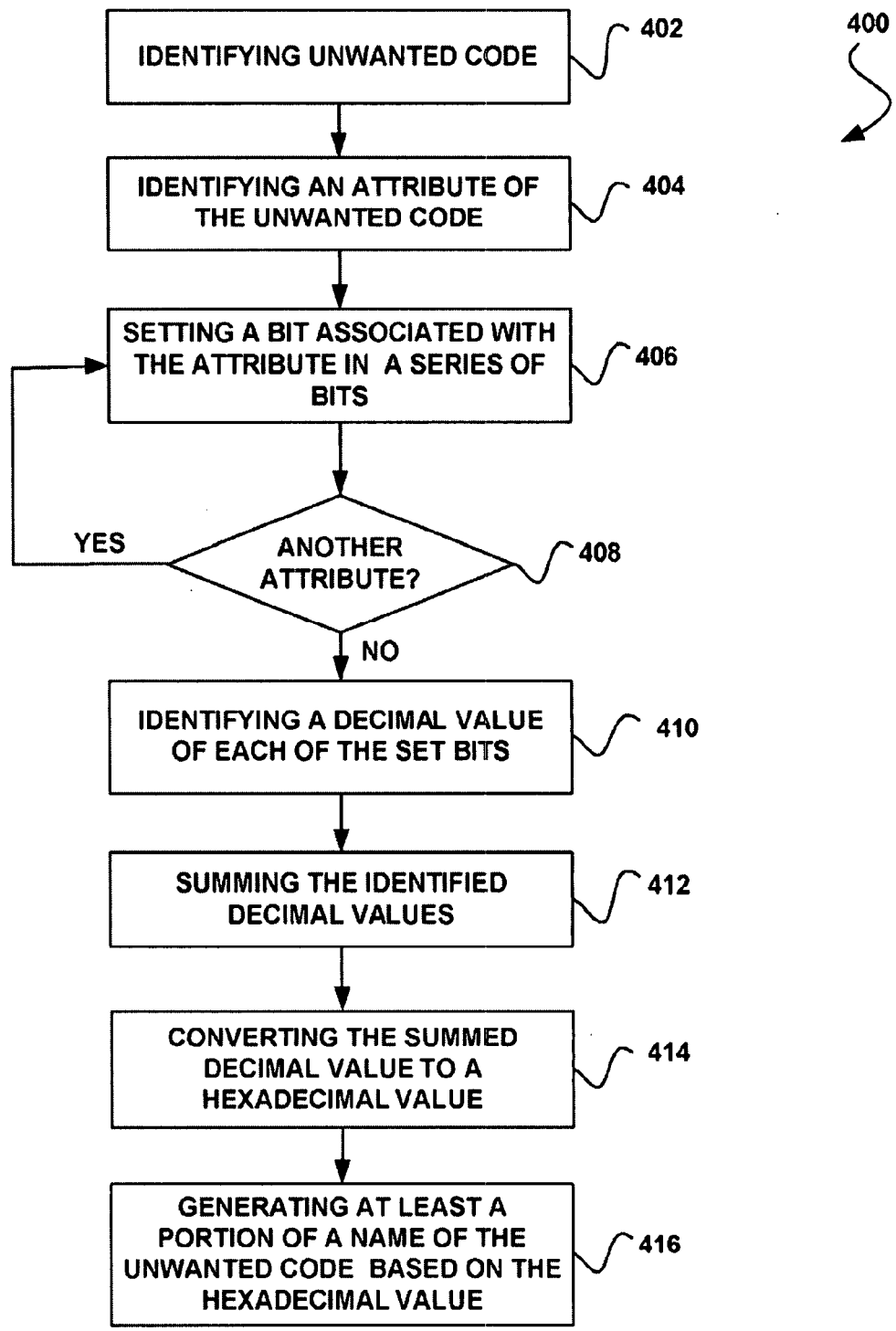
FIG. 4 shows a method for generating an encoded name for unwanted code, where at least a portion of the encoded name is based on an attribute of the unwanted code, in accordance with another embodiment.

FIG. 4 shows a method 400 for generating an encoded name for unwanted code, where at least a portion of the encoded name is based on an attribute of the unwanted code, in accordance with another embodiment. As an option, the method 400 may be implemented in the context of the architecture and environment of FIGS. 1-3. Of course, however, the method 400 may be carried out in any desired environment. It should also be noted that the aforementioned definitions may apply during the present description.

As shown in operation 402, unwanted code is identified. The unwanted code may be identified utilizing an intrusion detection system, a virus scanner, a firewall, and/or any other application capable of identifying unwanted code. In one optional embodiment, the unwanted code may be identified utilizing heuristics, for example. Manual identification is also contemplated.

An attribute of the unwanted code is also identified, a shown in operation 404. The attribute may be identified utilizing any desired technique. In various embodiments, the attribute may be identified based on a format of the unwanted code, a type of the unwanted code, an effect of the unwanted code, etc.

In addition, a bit associated with the attribute is set in a series of bits, as shown in operation 406. In one embodiment, a different bit may be associated with each of a plurality of different attributes. Thus, the bit may be included in a series of bits, where each of the bits in the series of bits is associated with a different attribute.

In one embodiment, the bit may be set by changing the bit from a 0 to a 1. In this way, bits set to 1 may indicate that unwanted code includes an attribute associated with such bit, whereas bits set to 0 may indicate that unwanted code does not include the attribute associated with such bit. Of course, however, the bit may be set in any desired manner.

As a result, setting the bit associated with a particular attribute may indicate that associated unwanted code includes the particular attribute. For example, if a bit associated with a virus attribute is set, it may be indicated that associated unwanted code is a virus. As another example, if a bit associated with a script file attribute is set, it may be indicated that the associated unwanted code takes the form of a script file.

It is then determined whether there are any more attributes associated with the unwanted code, as shown in decision 408. If it is determined that there are additional attributes associated with the unwanted code, a bit corresponding to each attribute is set, as shown. Thus, a series of bits may indicate a plurality of attributes of unwanted code. In one embodiment, such series of bits may be stored in a database for each type of unwanted code.

If it is determined that there are not additional attributes associated with the unwanted code, the method 400 continues, as shown. Specifically, as shown in operation 410, a decimal value of each of the set bits it identified. In one embodiment, each of the bits in a series of bits may be associated with a unique decimal value. Accordingly, each attribute associated with each bit may also be associated with a unique decimal value. Moreover, attribute information, including attributes associated with unwanted code, and unique value information, including the associated decimal values may be stored in a database for each bit in a series of bits associated with unwanted code.

Such unique value may optionally include a predefined value. For example, the unique value may be predefined by any entity, such as for example an entity providing a system that identifies unwanted code. In one exemplary embodiment, the unique value of each bit may be predefined by AVERT of McAfee®, Inc.

Optionally, the decimal values of the bits may include any desired decimal values. In one embodiment, the decimal values may each be included in multiples of two (e.g. 32768, 16384, 8192, etc.). In another embodiment, the decimal values may include any decimal values, such that an algorithm may be applied to a sum of any number of the decimal values for determining each of the decimal values represented in the sum.

Still yet, the identified decimal values are summed, as shown in operation 412. Thus, a single decimal value may represent a plurality of decimal values. Consequently, the single decimal value may represent a plurality of attributes of unwanted code.

Moreover, the summed decimal value is converted to a hexadecimal value. Note operation 414. In particular, the summed decimal value may be converted from a decimal format to a hexadecimal format. For example, the summed decimal value may be converted to a hexadecimal value that is equivalent in value to the summed decimal value. In this way, the hexadecimal value may provide a condensed value (e.g. shorter length, less number of characters, etc.) with respect to the summed decimal value.

At least a portion of a name of the unwanted code is then generated based on the hexadecimal value, as shown in operation 416. In one embodiment, at least a portion of the name may include the hexadecimal value. Thus, the name of the unwanted code may be encoded. Further, the name of the unwanted code may be utilized for identifying any number of attributes of the unwanted code.

As an option, the name of the unwanted code may also include a unique identifier (not shown). Such unique identifier may include any sequence of characters, numbers, etc. capable of uniquely identifying the unwanted code. In this way, the name of the unwanted code may include a value representing any number of attributes of the unwanted code as well as a unique identifier that ensures a uniqueness of the name for the unwanted code.

In one embodiment, the name may be encoded such that a number of attributes may be represented in the name while still limiting the length of the name and/or while still complying with any name length restrictions. For example, each attribute of the unwanted code may not necessarily be spelled out in the name. In this way, the encoded name itself may describe the unwanted code, thus providing relevance between the encoded name and the unwanted code and further eliminating any need for an external description thereof.

In another embodiment, the encoded name may identify data utilized for detecting instances of the unwanted code. Such data may include, for example, signatures, drivers, data located in data (DAT) files, etc. In addition, the data may be utilized by a detection system (e.g. intrusion detection system, virus scanner, etc.) for detecting instances of the unwanted code. Thus, the data utilized for detecting instances of unwanted code may be named according to the encoded name of the unwanted code, in the manner described above.

In still yet another embodiment, the encoded name may allow users of detection systems to be dynamically informed of the detection of the unwanted code utilizing the encoded name. Further, such users may be provided with attributes of the unwanted code based on the encoded name. For example, users may optionally select the encoded name, which may be presented via an alert, or a search of a database of information associated with unwanted code, and such encoded name may be automatically decoded for identifying and presenting attributes of the detected unwanted code to the user. As a result, the need for manual entry of descriptions of unwanted code may be prevented, and users may be efficiently informed of attributes of detected unwanted code.

Optionally, the encoded name of the unwanted code may be unencoded utilizing an algorithm (not shown). In one embodiment, the algorithm may include binary operators utilized for identifying each of the decimal values within encoded name. Moreover, such decimal values may then be compared with a database of decimal values for identifying attributes associated therewith. As a result, the unencoded name may identify attributes of the associated unwanted code.

Figure 5:
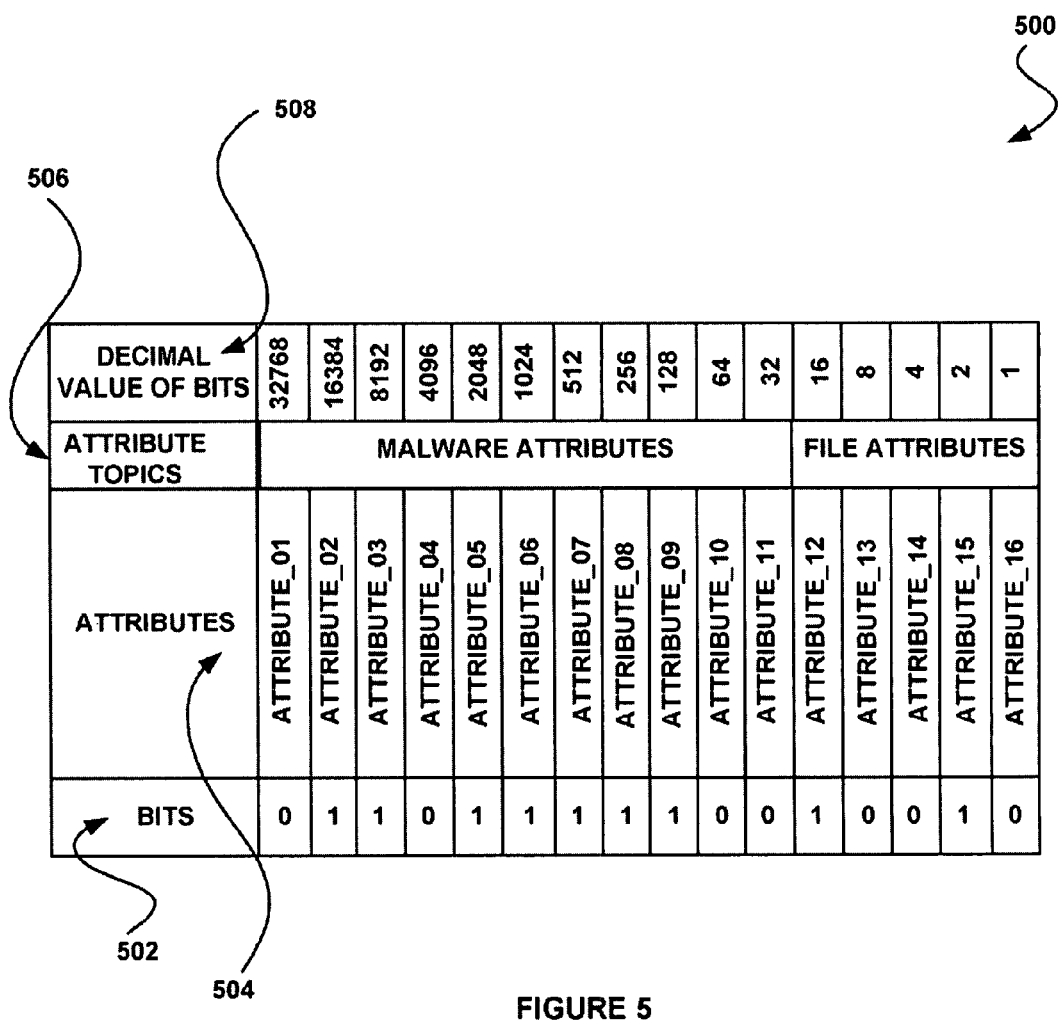
FIG. 5 shows a data structure utilized for identifying a value of unwanted code, in accordance with yet another embodiment.

FIG. 5 shows a data structure 500 utilized for identifying a value of unwanted code, in accordance with yet another embodiment. As an option, the data structure 500 may be implemented in the context of the architecture and environment of FIGS. 1-4. Of course, however, the data structure 500 may be carried out in any desired environment. It should also be noted that the aforementioned definitions may apply during the present description.

As shown, the data structure 500 includes a plurality of bits 502. The plurality of bits may include a representation of a particular type of unwanted code that has been detected (e.g. via an intrusion detection system, firewall, etc.). For example, such particular type of unwanted code may be newly detected, such that a name may be needed for uniquely identifying the unwanted code and any future detections thereof.

In addition, each bit 502 is associated with an attribute 504. Also, the attributes 504 are associated with attribute topics 506. Such attribute topics 506 include malware attributes and file attributes, as shown. Table 1 illustrates an exemplary list of attributes 504 that may be associated with unwanted code, and therefore that may optionally be represented by bits. It should be noted that the attributes described in Table 1 are set forth for illustration only, and should not be construed as limiting in any manner.

Table 1

1. Parasitic
2. Worm
3. Virus
4. Internet Chat Relay (IRC)
5. Peer-2-Peer
6. Download
7. Upload
8. Key-logger
9. Password stealer
10. BackDoor
11. Exploit
12. Mass Mailer
13. SPAM proxy
14. Infector
15. Lowers Internet Explorer (IE) Zones
16. Modifies Homepage
17. Win32 EXE file
18. Win32 DLL file 19. Script file
20. Encrypted/Packed file
21. Reserved Further, the bits 502 are ordered according to the attribute topics 506. For example, as shown, malware attributes may be associated with a first section of bits and file attributes may be associated with a second section of bits subsequent to the first section of bits. Of course, it should be noted that the bits and associated attributes may be ordered in any desired manner.

Moreover, the bits 502 are each associated with a decimal value 508. The decimal values 508 may be unique for each bit, as shown. Further, the decimal values 508 may be predefined such that unencoding will result in only one possible associated description. Still yet, the data structure 500 may be utilized for setting bits to 0 or 1. Each set bit may represent an attribute that is associated with the unwanted code.

Thus, as shown, the unwanted code associated with the present embodiment may include attribute_02, attribute_03, attribute_05, and so forth. The decimal values 408 associated with the set bits, and therefore the attributes 504 associated with the unwanted code, may be identified utilizing the data structure 500. Such data structure and/or any of the information associated therewith may be stored in a database, for access by detection systems.

The decimal values 408 associated with the set bits may also be summed, such that a single decimal value may identify the attributes 504 associated with the unwanted code. The summed decimal value may then be converted, as will be shown in FIG. 6, such that the converted decimal value may be utilized for naming the unwanted code.

Figure 6:
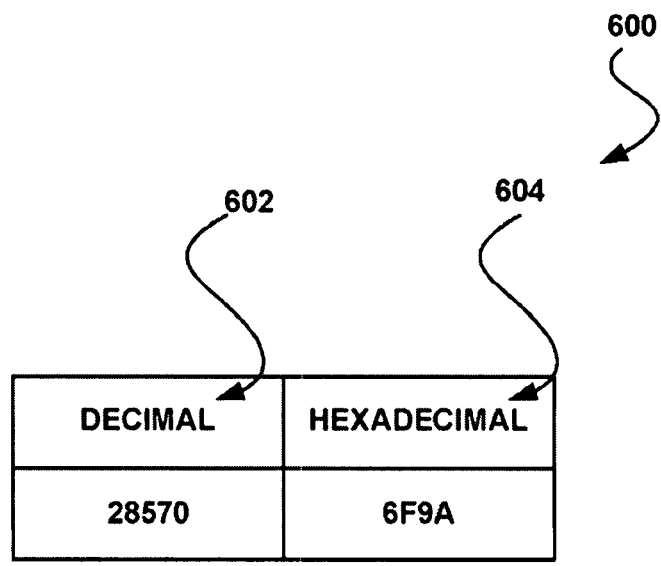
FIG. 6 shows a table illustrating a conversion of a value of unwanted code from a first format to a second format, in accordance with still yet another embodiment.

FIG. 6 shows a table 600 of a conversion of a value of unwanted code from a first format to a second format, in accordance with still yet another embodiment. As an option, the table 600 may be implemented in the context of the architecture and environment of FIGS. 1-5. Of course, however, the table 600 may be carried out in any desired environment. It should also be noted that the aforementioned definitions may apply during the present, description.

As shown, the summed decimal value 602 may be converted to a hexadecimal value 604. The hexadecimal value 604 may represent a condensed value of the summed decimal value 602. In this way, the hexadecimal value 604 may be utilized for generating a name of the unwanted code.

For example, the hexadecimal value 604 may be included in the name of the unwanted code. In one embodiment, the hexadecimal value 604 may be included in a portion of the name of the unwanted code. With respect to the present embodiment, where the hexadecimal value is 6F9A, the name of the unwanted code may include ID6F9A, for example. Of course, however, the hexadecimal value 604 may also make up the entire name of the unwanted code.

As shown, 16 attributes may be available for being associated with unwanted code utilizing 16 bits (see FIG. 5). Further, such 16 bits may then be converted to a hexadecimal format, thus allowing only 4 hexadecimal characters to represent such 16 attributes. In other various embodiments, 8 attributes may be available with respect to 8 bits, such that only 2 hexadecimal characters may be utilized to represent the 8 attributes. Likewise, 32 attributes may be represented by 8 hexadecimal characters. Of course, it should be noted that any number of attributes may be available for being associated with unwanted code, and that the number of hexadecimal characters utilized to represent such attributes will vary accordingly.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
scanning a computer using a detection system that includes a processor;
identifying unwanted code and at least one attribute of the unwanted code; and
generating an encoded name for the unwanted code, which includes malware, at least a portion of the encoded name including a hexadecimal value representing the at least one attribute of the unwanted code, wherein the encoded name reflects, at least, data utilized in detection of instances of the unwanted code in the computer, and wherein the encoded name is decoded and used for a notification that reflects a plurality of attributes of the unwanted code identified by the detection system, wherein generating the encoded name for the unwanted code comprises:
setting a bit associated with each of the at least one attribute, and wherein the bit is included in a series of bits, each of the bits being associated with a different attribute, wherein the encoded name of the unwanted code includes a value representing the at least one attribute of the unwanted code and a unique identifier, and wherein the name of the unwanted code is encoded utilizing a bitmask, wherein the bit is associated with a unique value, and wherein attribute information and unique value information is stored in a database for each bit.

2. The method of claim 1, wherein the at least one attribute includes a type of the unwanted code.

3. The method of claim 1, wherein the at least one attribute includes an effect of the unwanted code.

4. The method of claim 1, wherein the at least one attribute includes a file format of the unwanted code.

5. The method of claim 1, wherein the unique value includes a decimal value.

6. The method of claim 1, wherein the unique value is utilized in encoding the name of the unwanted code.

7. The method of claim 1, wherein generating the encoded name for the unwanted code further comprises calculating a sum of unique values associated with each set bit.

8. The method of claim 7, wherein generating the encoded name for the unwanted code further comprises converting the sum to a different format.

9. The method of claim 8, wherein converting the sum to the different format includes converting the sum from a decimal format to a hexadecimal format.

10. The method of claim 1, and further comprising unencoding the name of the unwanted code utilizing an algorithm.

11. The method of claim 10, wherein the unencoded name identifies the at least one attribute.

12. The method of claim 1, wherein the hexadecimal value makes up the entire encoded name for the unwanted code.

13. The method of claim 1, wherein the at least one attribute of the unwanted code is associated with an attribute topic, the attribute topic including malware attributes or file attributes.

14. The method of claim 13, wherein a first attribute of the at least one attribute of the unwanted code is associated with a first attribute topic, and a second attribute of the at least one attribute of the unwanted code is associated with a second attribute topic.

15. A computer program product embodied on a non-transitory computer readable medium for performing operations, comprising:
  scanning a computer;
  identifying unwanted code and at least one attribute of the unwanted code; and
  generating an encoded name for the unwanted code, which includes malware, at least a portion of the encoded name including a hexadecimal value representing the at least one attribute of the unwanted code, wherein the encoded name reflects, at least, data utilized in detection of instances of the unwanted code in the computer, and wherein the encoded name is decoded and used for a notification that reflects a plurality of attributes of the unwanted code identified by a detection system, wherein generating the encoded name for the unwanted code comprises:
  setting a bit associated with each of the at least one attribute, and wherein the bit is included in a series of bits, each of the bits being associated with a different attribute, wherein the encoded name of the unwanted code includes a value representing the at least one attribute of the unwanted code and a unique identifier, and wherein the name of the unwanted code is encoded utilizing a bitmask, wherein the bit is associated with a unique value, and wherein attribute information and unique value information is stored in a database for each bit.

16. A system, comprising:
  a computer including a processor, wherein code to be executed by the processor is configured for:
  identifying unwanted code in a computer, and at least one attribute of the unwanted code;
  generating an encoded name for the unwanted code, which includes malware, wherein at least a portion of the encoded name including a hexadecimal value that represents the at least one attribute of the unwanted code, wherein the encoded name reflects, at least, data utilized in detection of instances of the unwanted code in the computer, and wherein the encoded name is decoded and used for a notification that reflects a plurality of attributes of the unwanted code identified in the computer, wherein generating the encoded name for the unwanted code comprises:
  setting a bit associated with each of the at least one attribute, and wherein the bit is included in a series of bits, each of the bits being associated with a different attribute, wherein the encoded name of the unwanted code includes a value representing the at least one attribute of the unwanted code and a unique identifier, and wherein the name of the unwanted code is encoded utilizing a bitmask, wherein the bit is associated with a unique value, and wherein attribute information and unique value information is stored in a database for each bit.

17. The system of claim 16, further comprising a display and memory coupled to the processor via a bus.

* * * * *